Figure 1:
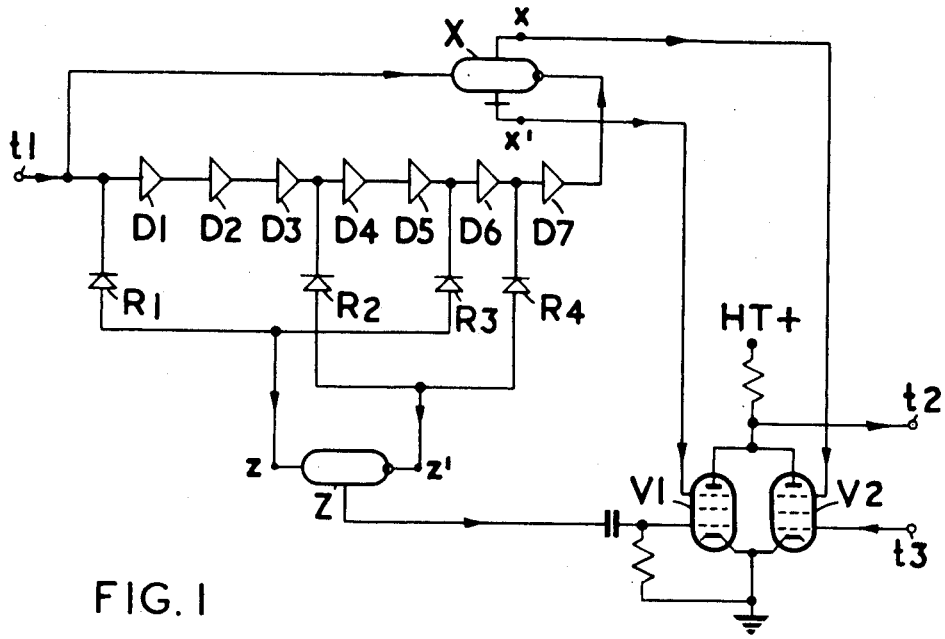

Oct. 18, 1955  R. H. BARKER  2,721,318
SYNCHRONISING ARRANGEMENTS FOR PULSE CODE SYSTEMS
Filed Feb. 16, 1953  6 Sheets-Sheet 1

Inventor
RONALD HUGH BARKER
By
Stevens, Davis, Miller + Mosher
Attorneys

Oct. 18, 1955  R. H. BARKER  2,721,318
SYNCHRONISING ARRANGEMENTS FOR PULSE CODE SYSTEMS
Filed Feb. 16, 1953  6 Sheets-Sheet 3

*Inventor*
RONALD HUGH BARKER
By
Stevens, Davis, Miller + Mosher
*Attorneys*

United States Patent Office 2,721,318
Patented Oct. 18, 1955

2,721,318
SYNCHRONISING ARRANGEMENTS FOR PULSE CODE SYSTEMS

Ronald Hugh Barker, Christchurch, England, assignor to National Research Development Corporation, London, England, a British corporation Application February 16, 1953, Serial No. 337,193

Claims priority, application Great Britain February 25, 1952

5 Claims. (Cl. 340—355)

The present invention relates to systems for synchronising digital information which present the digital information serially in the form of a temporal succession of digit signals, generally pulse signals in one of two or more states.

Two problems exist in connection with the synchronisation of digital information when it is transmitted in a serial manner.

The first is concerned with the extraction of the basic digit repetition frequency, and the second with the labelling of one particular digit signal in a group, such as a binary code group, so that all the other digit signals in the group may be given a weighted significance. This invention relates to the latter problem. The invention employs a prearranged sequence of digit signals, which is called a synchronising pattern in this specification, and which is transmitted with the train of digital information when required and is arranged to be recognised at a receiver by suitable circuits which as a result unambiguously label one particular digit signal. The synchronising pattern of digit signals may be sent once at the beginning of a message, or it may be repeated at intervals to label one digit signal of a group, for example, in time multiplexed systems.

The invention aims at providing synchronising patterns for digital transmission systems in which the probability of false synchronisation due to a chance occurrence of the prearranged synchronising pattern is reasonably low, and the probability of failure to synchronise due to distortion of the synchronising pattern during transmission is reasonably low; having regard to the number of digit signals in the synchronising pattern.

These advantages are brought about through the use of certain special synchronising patterns according to the invention. The invention will be described in terms of binary digital systems, but may be extended to systems with a higher modulus or to pulse amplitude-modulated time-multiplexed systems.

In order that the description of the invention and the appended claims may be better understood, the autocorrelation sequence of a digit pattern will now be defined. Let the pattern consist of the sequence of $n$ digits:

$$a_1, a_2, a_3, \ldots a_r, \ldots a_n$$

Then the autocorrelation sequence is the following symmetrical sequence of $2n-1$ digits:

$$b_1, b_2, b_3 \ldots b_r \ldots b_n \ldots b_r \ldots b_3, b_2, b_1$$

These digits are given by the following relations:

$$b_1 = a_1.a_n$$
$$b_2 = a_1.a_{n-1} + 1_2.a_n$$
$$b_3 = a_1.a_{n-2} + a_2.a_{n-1} + a_3.a_n$$
$$\ldots$$
$$b_r = \sum_{x=1}^{r} a_x.a_{x+n-r}$$
$$\ldots$$
$$b_n = \sum_{x=1}^{n} a_x^2$$

In a binary system in which each digit signal is, or has been, converted into either a unit positive signal or a unit negative signal, the pattern is said to be ideal if all the terms of its autocorrelation sequence except the middle one, $b_n$, are zero or negative, while the middle term is positive and is as large as possible. The simplest ideal pattern which will be called pattern A is one of three binary digits, namely $+1$, $+1$, $-1$, where plus one and minus one stand for the two levels of the binary system. Its autocorrelation sequence is:

$$-1, 0, +3, 0, -1$$

Another simple pattern, pattern B, which is ideal according to the above definition, is:

$$+1, +1, +1, -1, -1, +1, -1$$

of which the autocorrelation sequence is:

$$-1, 0, -1, 0, -1, 0, +7, 0, -1, 0, -1, 0, -1$$

A further ideal pattern, pattern C, is:

$$+1, +1, +1, -1, -1, -1, +1, -1, -1, +1, -1$$

of which the autocorrelation sequence is:

$$-1, 0, -1, 0, -1, 0, -1, 0, -1, 0, +11, 0, -1, 0,$$
$$-1, 0, -1, 0, -1, 0, -1$$

None of the 0 and $-1$ terms in the above autocorrelation sequences of ideal synchronising patterns can be made more negative without some other of the terms becoming more positive. These patterns are therefore ideal in the sense that they cannot be improved.

There are probably no more synchronising patterns which are ideal as defined above in addition to patterns A, B and C. In any case, it is probable that an ideal synchronising pattern must satisfy the following two conditions:

(i) The number of digits must be one less than an integral multiple of four that is 3, 7, 11, 15, etc.; and
(ii) If digits are paired counting from both ends, the odd pairs must be different, while the even pairs must be alike.

Examples of patterns which are nearly ideal, in that none of the terms of their autocorrelation sequences except the middle one exceed $+1$, are pattern D:

$$+1, +1, -1, +1, -1$$

having an autocorrelation sequence:

$$-1, 0, +1, -2, +5, -2, +1, 0, -1;$$

pattern E:

$$+1, +1, -1, -1, +1, -1$$

having an autocorrelation sequence:

$$-1, 0, +1, -2, -1, +6, -1, -2, +1, 0, -1;$$

pattern F:

$$+1, +1, -1, -1, -1, +1$$

having an autocorrelation sequence:

$$+1, 0, -3, -2, +1, +6, +1, -2, -3, 0, +1;$$

pattern G:

$$-1, +1, +1, +1, -1, -1, +1, -1$$

having an autocorrelation sequence:

$$+1, -2, +1, 0, -1, -2, -1, +8,$$
$$-1, -2, -1, 0, +1, -2, +1;$$

pattern H:

$$+1, -1, +1, -1, -1, -1, +1, +1$$

having an autocorrelation sequence:

$$+1, 0, -1, 0, -3, 0, -1, +8, -1, 0, -3, 0, -1, 0, +1;$$

and pattern J:

$$+1, -1, +1, -1, -1, +1, -1, -1, -1, +1$$

having an autocorrelation sequence:

$$+1, -2, +1, 0, -1, 0, +1, 0, -3,$$
$$+10, -3, 0, +1, 0, -1, +1, -2, +1$$

In digital systems based upon a modulus greater than 2 or in pulse amplitude modulated systems, the ideal pattern will be the same as that for the binary system, except that the digits $+1$ and $-1$ are replaced by digits or pulses having a prearranged positive and corresponding negative potential level.

It will be appreciated that each pattern of digits A to J etc. is one representative form of four possible forms of a digit pattern. The other three forms are readily obtained from the form given by (i) reversing the digit order, (ii) reversing the polarity of each digit, and (iii) reversing both the digit order and the polarity of each digit. Thus pattern A has three other forms (i) $-1, +1, +1$, (ii) $-1, -1, +1$, and (iii) $+1, -1, -1$.

Synchronising patterns of digits having autocorrelation sequences which are ideal or nearly ideal are used in digital transmission (pulse code) systems to identify at a receiver a particular digit signal in the following manner. The digital transmission, including a synchronising pattern of say $n$ digits which has been inserted therein at predetermined times, is fed to a pattern recogniser in a receiver which is arranged to add together pulses derived from $n$ successive digit signals in the applied transmission. The pulses were added together after passing through $n$ parallel modifying circuits each of which functions in one of two ways in accordance with the nature of the digit signal in the corresponding position in the synchronising pattern to produce a positive or negative pulse to be added to the others. The combined output of the pattern recogniser due to an applied synchronising pattern during the $(2n-1)$ digit periods that it is passing through the recogniser is the autocorrelation sequence of the synchronising pattern.

Thus if the synchronising pattern is pattern B consisting of the seven digits:

$$+1, +1, +1, -1, -1, +1, -1$$

the output of the recogniser during this $(2n-1)$ digit period is:

$$-1, 0, -1, 0, -1, 0, +7, 0, -1, 0, -1, 0, -1$$

and it will be seen that the middle digit period, which occurs when all the signals in the pattern are being applied to the recogniser, can be easily recognized by an amplitude discriminator, which may generate a pulse to label this digit period.

However, the synchronising pattern is part of a digital message, and it is preceded and followed by random digit signals, which will modify the output of the pattern recogniser. Thus, in the case of synchronising pattern B, during the digit periods immediately before and after the middle digit period there are six digit signals of the synchronising pattern being applied to the recogniser which yield an output of 0 units, and one random digit signal. Assuming that the different types of digit signals are equally likely to occur, the probability that this digit signal is such that it will yield a $+1$ output is $\frac{1}{2}$ in each case, so that for these digit periods the probability is $\frac{1}{2}$ that the total output of the recogniser is the maximum possible of $+1$.

It may be similarly deduced that for the digit periods two before or after the middle digit period, the output of the recogniser is made up of $-1$ units from five digit signals of the synchronising pattern and the probability is $\frac{1}{4}$ that the output due to the remaining two random digit signals is $+2$. Thus for these digit periods the probability is $\frac{1}{4}$ that the output is the maximum possible of $+1$.

By continuing this process the maximum possible amplitudes of the outputs from the pattern recogniser during digit periods before and after the middle or synchronising digit period can be determined, and their probabilities of occurrence can be calculated. They are tabulated below for an ideal synchronising pattern of $n$ digits.

| Digit period relative to the synchronising middle period | Maximum output | Probability of occurrence of the maximum output |
|---|---|---|
| 0 | $n$ | 1 |
| ±1 | 1 | ½ |
| ±2 | 1 | ¼ |
| ±3 | 3 | ⅛ |
| ±4 | 3 | ⅟₁₆ |
| ±5 | 5 | ⅟₃₂ |
| ... | ... | ... |
| before $-n$ and after $+n$ | $n$ | ½$^n$ |

By making $n$ large enough the probability that the synchronising pattern will occur by chance in the random sequence may be made as small as is desired.

It will be seen from a study of this table that as the output $n$ during the middle period is greater than the maximum possible output during the remainder of the $(2n-1)$ digit periods that the synchronising pattern is passing through the recogniser, the recogniser can produce a correctly timed synchronising pulse. Thus a pattern of digits which is not necessarily ideal or even nearly ideal (in that no non-middle term of its autocorrelation sequence exceeds $+1$) can be used successfully as a synchronising pattern, provided that the maximum possible output for non-middle periods is sufficiently less pronounced than the middle period output to not be as great, even when transmission errors occur at their normally expected rate.

Thus for example, the digit pattern K:

$$+1, +1, +1, -1, -1, -1, +1, +1,$$
$$-1, -1, +1, -1, -1, +1, -1$$

has an autocorrelation sequence:

$$-1, 0, -1, 0, -1, 0, -1, 0, +3, 0, -1, 0, -5, 0,$$
$$+15, 0, -5, 0, -1, 0, +3, 0, -1, 0, -1, 0, -1, 0, -1$$

which has two $+3$ terms which are the only terms in excess of $0$ and $+1$. The pattern K is therefore not ideal like patterns A to C or nearly ideal like patterns D to J. However, the maximum possible output during the two periods ±6 digit periods from the middle period is $+9$ which is 6 units less than the output of $+15$ during the middle period so that pattern H can effectively function as a synchronising pattern. It will be noted that, although less likely to occur, the maximum possible output during any of the digit periods more than 9 periods from the middle is greater than $+9$.

The conditions that a digit pattern comprising $n$ binary digit signals must satisfy in order to be a synchronising pattern according to the invention are that when the $n$ digit signals are represented as $+1$ or $-1$ signals then of the $(2n-1)$ terms of their autocorrelation sequence no non-middle term other than the two end terms is as great as $n$ minus the numer of terms it is removed from the middle term, while neither end term exceeds $+1$. These conditions ensure that the maximum possible output of a pattern recogniser dealing with such a synchronising pattern in a digital transmission during the $(2n-1)$ digit periods that the pattern is passing through the recogniser is less than the output during the middle or synchronising period, except for the first and last periods. The maximum possible output during the first and last periods is equal to the middle period output but the probability that this will occur is only twice the probability that the maximum output will be obtained anywhere else during the transmission. Thus false synchronisation cannot occur during these $(2n-1)$ digit periods unless the transmission errors are excessive. To allow for transmission errors, the amount that the maximum possible output during a given digit period is less than the output during the middle period should be increased with the nearness of the digit period to the middle period, in step with the increase in probability that the maximum output will be obtained. This requirement is in fact met by all the example patterns A to K.

An increase in the probability of correct synchronisation over a channel having a certain rate of transmission errors can be obtained by increasing the number of digits in the synchronising patterns used. As previously stated, it is not necessarily possible to obtain ideal synchronising patterns composed of a large number of digits. However, according to a feature of the invention it is possible to obtain useful and in fact nearly ideal synchronising patterns, having autocorrelation sequences with no non-middle term exceeding +1, by using ideal sequences of ideal patterns A, B and C. Thus as the sequence +1, +1, −1 is ideal pattern A a synchronising pattern is obtained by writing down the ideal pattern B in its reversed form −1, +1, −1, −1, +1, +1, +1, twice with unchanged polarity followed by once with the polarity reversed.

The nearly ideal pattern so obtained, pattern L, is:

−1, +1, −1, −1, +1, +1, +1, −1, +1, −1, −1,
 +1, +1, +1, +1, −1, +1, +1, −1, −1, −1 of which the autocorrelation sequence is 1, 0, 1, 0, 1, 0, −7, 0, 1, 0, 1, 0, 1, 0, −3,
 0, −3, 0, −3, 0, 21, 0, −3, 0, −3, 0, −3, 0,
   1, 0, 1, 0, 1, 0, −7, 0, 1, 0, 1, 0, 1

Other possible combinations of ideal patterns A, B, and C of 3, 7 and 11 digits respectively yield patterns having 9, 33, 49, 77, and 121 digits.

Apparatus for generating and recognising synchronising patterns will normally increase in complexity with increase in pattern length, but this increase is much less for long patterns made up of a combination of ideal synchronising patterns.

Methods of generating and recognising synchronising patterns will now be described with reference to the drawings filed with this specification. Any pattern may be generated or recognised by these methods but the advantages of using them to synchronise messages will increase as the pattern chosen approaches an ideal one as judged by the terms of its autocorrelation sequence.

Figure 3:
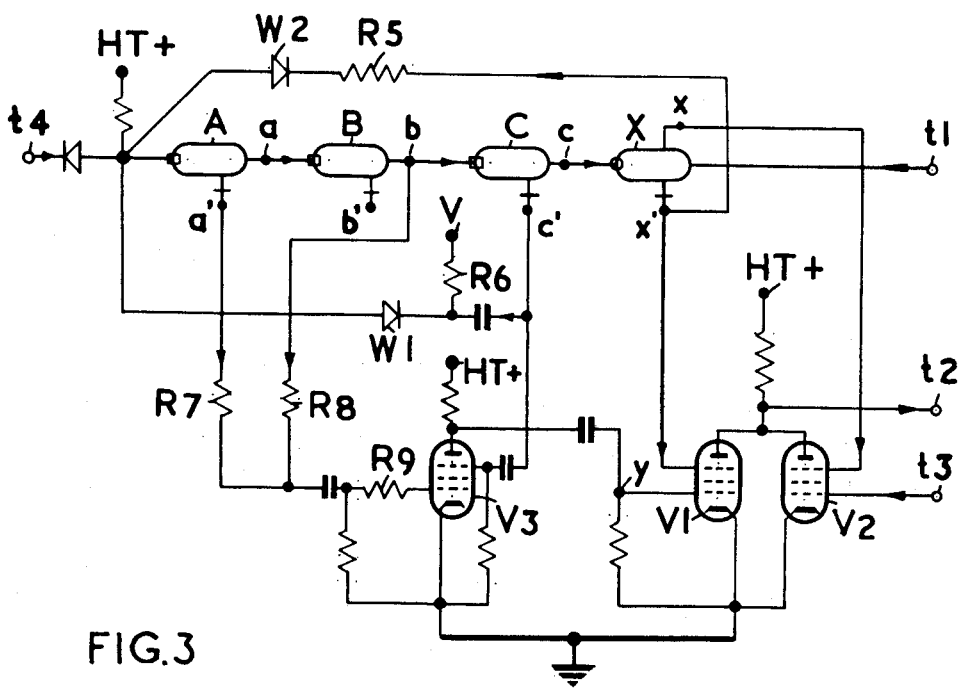
Figure 4:
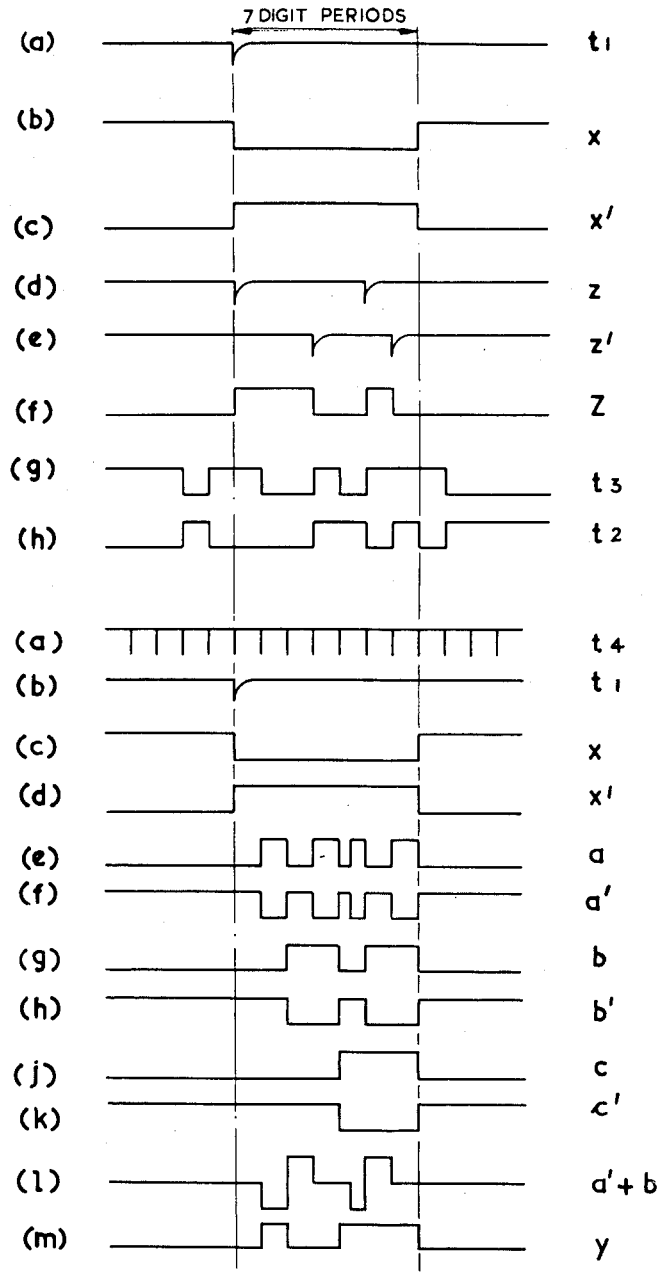
Figure 10:
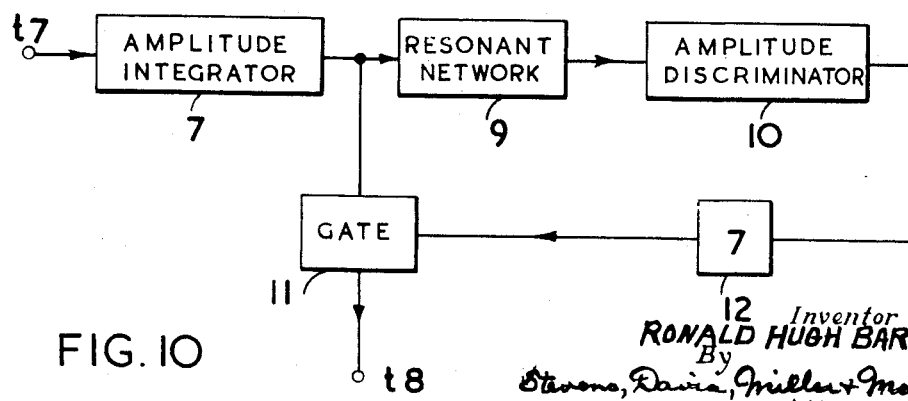
Figure 11:
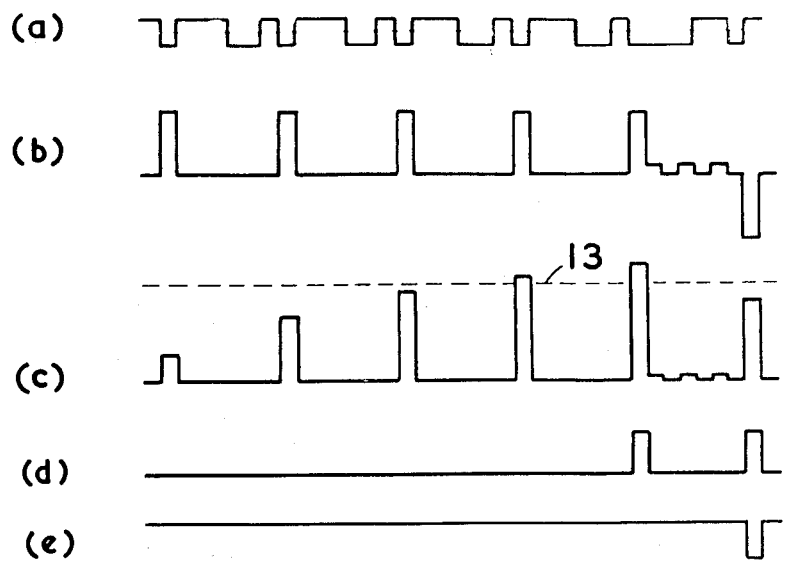

In the drawings:

Figures 1, 3, 7, and 9 show various alternative arrangements for generating synchronising patterns and inserting them in a transmitted message;

Figures 5, 6, 8, 10 and 12 show various alternative arrangements for recognising synchronising patterns in a received message and generating a synchronising pulse as a result; while Figures 2, 4 and 11 depict voltage waveforms occurring at various parts of the circuit arrangements shown in Figures 1, 3 and 10 respectively.

In Figures 1, 3, 5, 7, 8, 9 and 10 various circuit elements such as triggers and delay networks are represented in accordance with the Turing notation often used in circuit diagrams of electronic digital computers. Details of circuit elements represented in accordance with the Turing notation are given in copending patent application No. 202,615, now Patent No. 2,686,632, issued August 17, 1954.

A simple method of generating a seven digit synchronising pattern and inserting it in a message consisting of a series of digit signals will now be described. Figure 1 shows in schematic form circuits for carrying this out while Figure 2 shows voltage waveforms appearing at various parts of the circuits.

As shown in Figure 1, a message in the form of a succession of pulse signals, is applied from terminal $t3$ to the grid of a pentode valve V2, and thence to its anode and output terminal $t2$ when valve V2 is not cut off on its suppressor grid. This is the normal condition when a synchronising pattern is not being generated and it will be seen that a trigger X must be off during this time so that a positive-going output from terminal $x$ is applied to the suppressor grid of valve V2, while a negative-going output from terminal $x'$ is applied to the suppressor grid of valve V1 to cut off this valve.

In order to substitute a synchronising pattern of digit signals in place of a portion of the message a short triggering pulse (synchronising signal) as shown in Figure 2($a$) is applied from terminal $t1$ to the trigger X, changing its state and therefore the voltage level on its output connections $x$ and $x'$. The voltage waveforms on the connections $x$ and $x'$ are as shown in Figures 2($b$) and 2($c$) respectively and it will be seen from Figure 1 that valve V2 is now cut off and valve V1 is now rendered conducting so that the voltage variations on the grid of valve V1 are now passed to the output terminal $t2$.

The triggering pulse is also applied to a chain of seven delay units D1 to D7, each of which imposes a delay equal to a digit period, i. e. the time allocated to each digit signal in the message. The output of delay unit D7 is applied to the resetting connection of the trigger X so that after seven digit periods it is reset and the voltage levels on the output connections $x$ and $x'$ are restored to normal, with the result that the states of the valves V1 and V2 are also restored to normal and the message appearing on terminal $t3$ is once more passed to output terminal $t2$.

Meanwhile during these seven digit periods, as the triggering pulse has been passing along the chain of delay units, a trigger Z has been set by the triggering pulse acting through rectifier R1, reset three digit periods later by it acting through rectifier R2, again set after a further two digit periods by it acting through rectifier R3, and finally reset after a further digit period by it acting through rectifier R4. The voltage waveform applied to the triggering connections $z$ and $z'$ are as shown in Figures 2($d$) and 2($e$) respectively and thus the voltage waveform on the output connection, as shown in Figure 2($f$), constitutes synchronising pattern B, +1, +1, +1, −1, −1, +1, −1, as previously described.

The total result is that if the message applied to terminal $t3$ is as shown in Figure 2($g$) the final output from terminal $t2$ is as shown in Figure 2($h$). In this final output the message and synchronising pattern are reversed in polarity. This is immaterial as far as the synchronising pattern is concerned as it has the same autocorrelation sequence in either polarity, and it may be convenient for the message applied to terminal $t3$ to be in an inverted form.

In the gate circuit comprising valves V1 and V2, direct connections must be used for the suppressor grids, but providing the beginning of the synchronising pattern is positive, A. C. coupling is permissible for it.

In the above arrangement the delay in the delay unit chain must be accurately related to the digit period. If the latter is a constant, this presents no particular difficulty but if it is subject to variation the delay time must be correspondingly altered. One way of doing this is to construct the delay chain of cold cathode gas filled valves so arranged that the pattern steps one place down the chain each time the circuit is impulsed by digit pulses. The necessary impulses are readily made available by any well-known process of extracting the basic digit repetition frequency.

An alternative circuit arrangement using fewer valves is shown in Figure 3 and will now be described, while voltage waveforms at various parts of the circuit are shown in Figure 4. In this arrangement also, pulses which mark the digit periods, as shown in Figure 4($a$) are required. The circuit shown in Figure 3 is arranged to generate the seven digit synchronising pattern B.

A synchronising pattern initiation pulse, as shown in Figure 4($b$), is applied from terminal $t1$, to set the trigger X so that the two outputs $x$ and $x'$ change as shown in Figures 4(c) and 4(d) and switch over the two valves V1 and V2 in a gate circuit. As a result the voltage appearing at the point $y$ on the grid of valve V1 is produced on the output terminal $t2$ instead of the message appearing on terminal $t3$ in a manner described with reference to Figure 1.

The output $x'$ from the trigger X is also connected through a rectifier W2 to the input of a chain of three counter units made up of triggers A, B and C which are arranged to count with a modulus of 7. In the normal condition before the incidence of a starting pulse, the voltage on connection $x'$ is relatively negative and the connection through the rectifier W2 prevents the timing pulses from terminal $t4$ being applied to the trigger A. A resistance R5 in series with the rectifier W2 is sufficient to prevent the trigger X being effected by these timing pulses.

After the starting pulse has set the trigger X, the timing pulses are applied to the trigger A until after the seventh pulse has been applied, the trigger X is reset by the output from trigger C. The normal condition is then restored and the triggers A, B and C remain in their normal condition. The voltage waveform appearing at the points $a$, $a'$, $b$, $b'$, $c$ and $c'$ shown in Figure 3 are shown in Figures 4(e) to 4(k) in order. As shown in Figure 3 the input to each counter trigger is to its changeover connection so that each trigger is set and reset by two successive input pulses. The triggering pulses fed to trigger A are as shown in Figure 4(a) and the triggering pulses fed to triggers B and C are similarly negative-going pulses derived when the preceding trigger is reset by differentiating the outputs $a$ and $b$ as shown in Figures 4(e) and 4(g) respectively. Each trigger therefore sends on one triggering pulse for every two it receives. The three triggers would normally count up to eight, but feed-back via a rectifier W1 from the terminal $c'$ to the input of trigger A, inserts an additional pulse when trigger C is first set so that the modulus is reduced by one to seven. A resistor R6 connected to a source of potential V is employed to provide a slight reverse bias to the rectifier W1 so that timing pulses do not affect the trigger C. This provision would be unnecessary if the rectifier W1 acted perfectly. For the circuit to operate correctly it is essential that the fourth timing pulse and the feedback pulse from trigger C do not occur simultaneously and so can be resolved. A short artificial delay line in the feedback path may be necessary to ensure this.

By suitably combining the voltages available at the output connections $a$ and $a'$, $b$ and $b'$, $c$ and $c'$ of the three triggers, it is possible to derive any desired seven-digit synchronising pattern. As shown in Figure 3 the outputs on $a'$, $b$ and $c'$ are combined in a valve V3 to produce a synchronising pattern on the grid of valve V1 as shown in Figure 4(m) which is synchronising pattern B. The voltages on $a'$ and $b$ are combined through the resistance network R7 and R8 to produce a voltage waveform on the grid of valve V3 as shown in Figure 4(l). Resistor R9 is a fairly high series resistance in the grid circuit of valve V3 which ensures that the valve is cut off during the second digit period, but not during the third and fourth digit periods of the synchronising pattern.

The voltage on $c'$ is applied to the suppressor grid of valve V3 to ensure that the output of the valve will be positive during the last three digit periods.

It will be appreciated that the methods of generating a particular seven digit synchronising pattern described with reference to Figures 1 and 3 are applicable with modifications to patterns of any length or arrangement.

Figure 5:
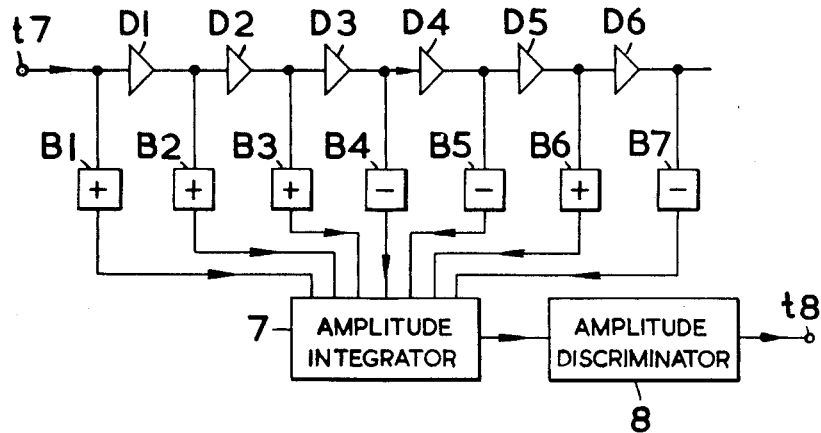

Methods of recognising a synchronising pattern in a received message will now be described. As already discussed this recognition is carried out in a pattern recogniser which is arranged to generate a synchronised pulse signal which labels a particular digit period when the pattern received agrees sufficiently well with the pre-arranged synchronising pattern for the probability of error to be arbitrarily small having regard to the rate of transmission errors in the transmission. When the synchronising pattern is $n$ digits long, the recogniser must be capable of storing at least $n-1$ digit signals if they are all to be added and contribute equally to the operation. The basis of the method is shown in Figure 5, using the seven digit pattern B in its reverse order $-1$, $+1$, $-1$, $-1$ $+1$, $+1$, $+1$. The message containing this synchronising pattern is applied from terminal $t7$ to a delay chain having units D1 to D6, each of which introduces a delay equal to one digit period. Connections to an amplitude integrator 7 from the delay chain are made through phase-reversing buffer elements B4, B5 and B7 which produce a unit positive ($+1$) pulse when a signal signifying a $-1$ type signal is applied, and a unit negative ($-1$) pulse when a signal signifying a $+1$ type signal is applied, and through non-phase-reversing elements B1, B2, B3 and B6 which produce a unit positive pulse when a signal signifying a $+1$ type signal is applied, and a unit negative signal when a signal signifying a $-1$ type signal is applied. The type of each of the elements in the order B7 to B1 is arranged as shown to correspond to the type of the corresponding digit in the synchronising pattern (pattern B reversed) so that the combination of the outputs from the modifying circuits due to the passing of the synchronising pattern of digit signals is their autocorrelation sequence of digit signals. Thus when the synchronising pattern sits exactly in the delay chain, the contributions from all the elements add at the same time to give a peak output, on receipt of which the amplitude discriminator 8 generates a synchronising signal which is supplied to terminal $t8$.

If the transmission is subject to interference or noise, all the digit signals may not be received correctly, and the output of the integrator 7 will not have its maximum amplitude. The function of the amplitude discriminator is to decide whether or not the amplitude is above a predetermined fraction of the absolute maximum, this fraction being set according to the expectation of transmission errors. If the pattern is correct within the permitted margin, the threshold of the discriminator is exceeded and an output pulse indicates the synchronising instant.

Figure 6:
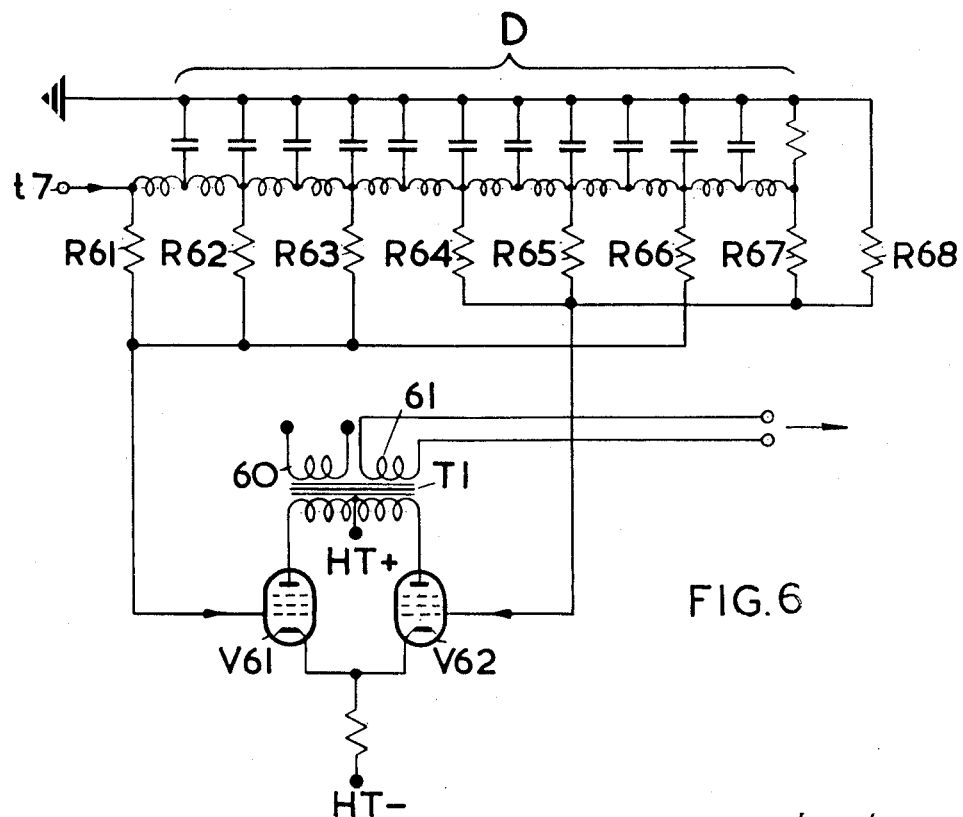

A practical realisation of the method of recognition of the seven digit synchronising pattern is illustrated in Figure 6. The main component is a lumped parameter delay line D terminated in its characteristic impedance. Tappings are made into the delay line through resistors R61 to R67, whose resistance values are high compared to the characteristic impedance. They may be slightly graded to allow for attenuation along the line D. The resistors are connected (according to the synchronising pattern sequence) to one or the other of the control grids of two valves V61 and V62 having a common cathode resistor of a high value so that the sum of the currents flowing through the two valves is stabilised around a given value. An extra resistor R68 which connects the grid of valve V62 to earth, is included so that the effective resistances presented at the two valve grids are equal. This is desirable in order that the voltage contribution due to one digit signal at the grid of each valve shall be the same whatever the position of the digit signal in the delay line. Amplitude discrimination is achieved by determining when the current through one valve exceeds that through the other by more than the predetermined amount set in accordance with the permitted number of errors. One way of doing this is shown in Figure 6, in which the valve currents flow in opposition through the windings of a transformer T1, the core of which is easily saturated. Current through the bias winding 60 ensures that the core is normally saturated. If the synchronising pattern is received with not more than the permitted number of errors the resultant of the two valve currents is sufficient to more than balance the bias current and the direction of flux through the core of the transformer T1 reverses. When this occurs a pulse appears at an output winding 61 indicating that the synchronising pattern is received.

Well known methods of amplitude discrimination based upon voltage comparison instead of current comparison could be applied to the invention. In either case it would be advantageous to control the bias current or voltage with respect to the amplitude of the incoming digit signals. If this is not done, both should be held as constant as possible.

It will be recalled that the synchronising signal (synchronising pattern triggering pulse) at the transmitter marks the first digit period of the synchronising pattern. At a receiver, employing a pattern recogniser, as described with reference to Figures 5 and 6, the synchronising signal is derived during the digit period that the leading digit signal of the synchronising pattern emerges from the chain of digit period delay units, so that if the whole received train of signals is passed through the delay chain, the same digit period will be marked by a transmitter and corresponding receiver synchronising pulses.

Figure 7:
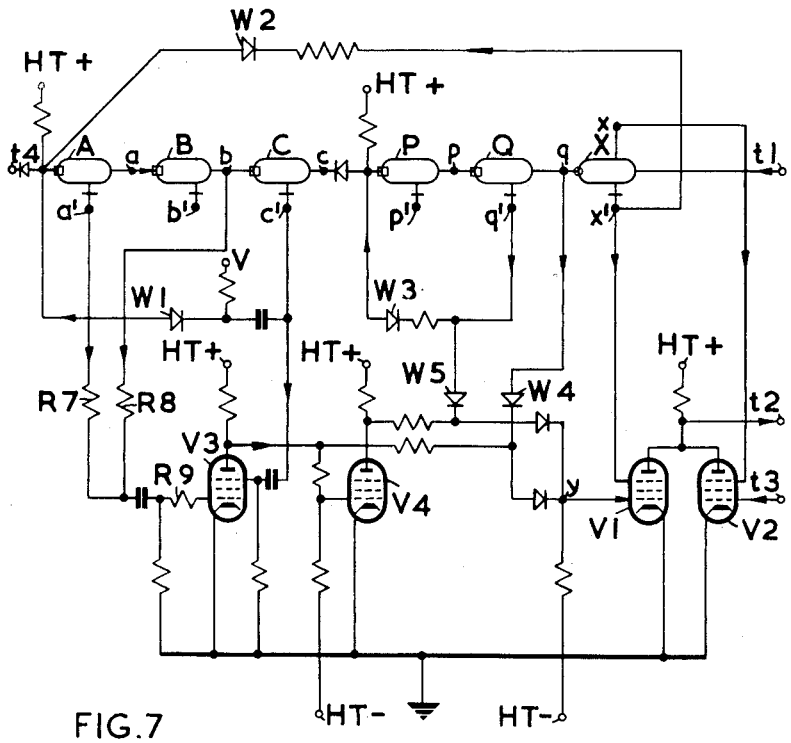

The generation of the type of synchronising pattern which is the combination in various polarities of a simpler synchronising pattern may be carried out by an extension of the methods already described with reference to Figures 1 and 3. For example, 21-digit pattern L may be generated by the counter method by modifying the counter circuit shown in Figure 3 by adding two more binary counter stages arranged to count modulus three, and control the output of the voltage waveform collecting valve V3. The circuit shown in Figure 3 modified in this manner is shown in Figure 7. The two additional binary counter stages are made up of triggers P and Q which are arranged to count modulus three instead of four because an additional pulse is added into the input to trigger P by feedback through a rectifier W3 from the output $q'$ from trigger Q. Trigger X is thus not reset until 21 digit periods after it was put on by a starting pulse from terminal $t1$ and so the voltage on the grid of valve V1 is passed for 21 digit periods to the output terminal $t2$ in place of the message appearing on terminal $t3$.

During these 21-digit periods, the triggers A, B and C have counted up to seven three times and so the output from valve V3 is a voltage corresponding to synchronising pattern B occurring three times. This output from valve V3 is fed either directly to point $y$ on the grid of valve V1 or through a sense reversing valve V4, according to the polarity of the outputs $q$ and $q'$ of the trigger Q which are applied through rectifiers W4 and W5 respectively to the two alternative inputs to the grid of valve V1 as shown.

For the first 14 digit periods the output from $q$ is relatively negative and so the seven digit pattern B is inserted with its normal polarity. For the final seven digit periods the output from $q'$ is relatively negative and the pattern B is inserted with reversed polarity.

Figure 8:
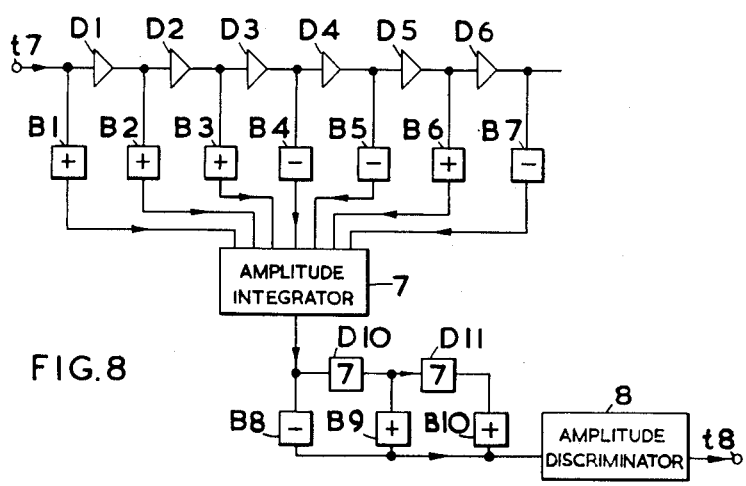

Recognition may be accomplished by the circuit arrangement shown in Figure 8, which is an extension of that illustrated in Figure 5, a further delay line D10 and D11 and buffer units being added to deal with the short ideal patterns B as unit groups. The amplitude integrator 7 for the seven digit pattern would then not act directly on the amplitude discriminator 8, but now operates instead, at intervals of seven digit periods, upon the three buffer units B8, B9 and B10. Each stage of delay D10 and D11 must correspond accurately in timing to seven digit periods and must have a frequency bandwidth as high as that in the amplitude integrator 7.

It may be desirable to utilise synchronising patterns having autocorrelation sequences which do not have such outstanding middle terms as patterns already described but which may be generated and recognised with less complicated equipment. Such patterns will need to be longer if they are to give an equivalent performance. One method of doing this is to perform the synchronising operation in two stages. The first stage consists of sending repeatedly one of the simple synchronising patterns. The number of repetitions must be sufficient to give an adequate guard against chance occurrence in a random sequence. By means of a pattern recogniser of the type described, one digit is distinctively labelled in every frame, that is every repeat of the simple synchronising pattern.

The second stage consists of identifying one particular frame following upon the train of repeated frames and a simple method of doing this is to send the synchronising pattern, already repeated, once more in reversed polarity during this frame.

Figure 9:
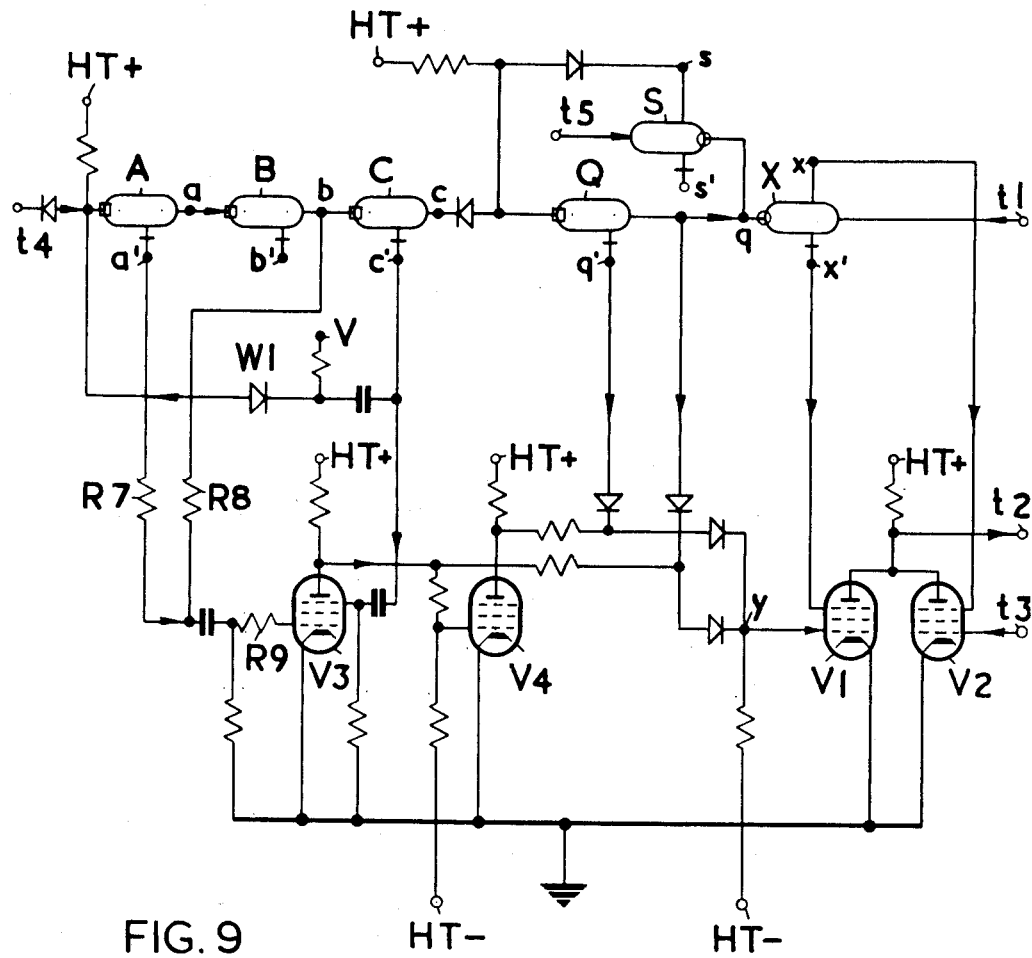

Figure 9 illustrates a modification of the arrangement shown in Figure 3 which can generate this type of synchronising signal. A rectifier gate and a binary counter stage Q are inserted between stages C and X, and the feedback connection from terminal $x$ to the counter input is removed. The counter stages comprising the triggers A, B and C therefore run continuously and produce a continuous output through valve V3 to the grid of valve V1. The rectifier gate is controlled by a similar trigger S in such a manner that negative pulses from the output connection $c$ are not normally transmitted through to trigger Q. At some convenient time before the instant of synchronising, a triggering pulse is supplied from terminal $t1$ to trigger X to set it. From this instant the repeating synchronising pattern generated by the counters A, B and C is inserted into the transmission by means of the gate valves V1 and V2 as previously described. The timing of the triggering pulse must be such as to permit an adequate number of repetitions of the synchronising pattern to be so inserted.

The state of trigger S is then changed by a synchronising signal applied from terminal $t5$ and the next complete frame to be transmitted is distinguished by being a synchronising pattern of reversed polarity. The end of the preceding frame is defined by a negative-going pulse from $c$ which is now permitted to set the trigger Q. This causes reversal of the polarity of the outputs from the trigger Q and thence the output from the valve V3 is reversed through the inverter valve V4 before being applied to the valve V1. After one frame of reversed polarity, a second negative pulse from $c$ resets the trigger Q. The resulting negative pulse from $q$ resets the triggers X and S so that no further operations take place.

Figure 10 shows in schematic form, an arrangement which may be provided at a receiver which comprises an amplitude integrator 7, as in Figure 5, together with a resonant network 9 tuned to the repetition frequency of the synchronising pattern, an amplitude discriminator or counter 10 which will determine when a sufficiently large number of repetitions of the pattern have been received and a gate 11 which then opens to let through the first pulse resulting from a frame of reversed polarity. As shown in Figure 10 the gate 11 is opened by the discriminator 10 through a delay line 12 imposing seven digit periods or one frame delay, though this delay is not always essential.

Suppose the simple synchronising pattern is ideal and is composed of $n$ digit signals. The output from the amplitude integrator 7 will be $$\ldots -1, -1, n, -1, -1 \ldots$$
$$-1, n, -1, -1, \ldots -1, -1, n, -1 \ldots$$

in which positive pulses of amplitude $n$ are separated by $n-1$ pulses of amplitude $-1$. One suitable form of resonant network 9 is a delay line fed from a high impedance source and open circuited at the remote end so that pulses are repeatedly reflected without change of phase, and build up. If each reflection is accompanied by an attenuation so that the amplitude of the reflected pulse is $d$ the times maximum amplitude that can be built up (when the ideal pattern is repeated a very large number of times) is $n/(1-d)$. Errors occur at random times and do not add in phase.

The operation of the system shown in Figure 10 may be understood by reference to the voltage wave forms in Figure 11. These utilise the seven digit pattern B as an example. In Figure 11(a) this pattern is shown repeated several times in the positive sense and once in the negative sense. The output of the recogniser is shown in Figure 11(b) and the build up of the pulses in the resonant network in Figure 11(c). When the pulse amplitude has built up to a level 13, which is sufficient to operate the amplitude discriminator 10, pulses as shown in Figure 11(d) are fed to the gate circuit 11 after a delay of seven digit periods. This delay is to ensure that a pulse is available to operate the gate 11 when the sense of the pattern is reversed. If the decrement of the resonant network 9 is sufficiently small, the stored energy would serve this purpose and the delay could be dispensed with. The gate 11 is of a type such that a synchronising pulse is generated as shown in Figure 11(e) by the coincidence of a negative pulse on its input terminal and a positive pulse on its control terminal.

The length of the synchronising pattern may be reduced if the a priori probability of synchronising is increased. One method of doing this is to send the synchronising pattern at regular intervals. The synchronising signal is then only accepted as correct if it is received at the instant it is expected. This method is obviously not capable of yielding absolute synchronisation, but only for marking repeatedly the beginning of a group. It is therefore suitable for most types of time multiplex systems.

Figure 12:
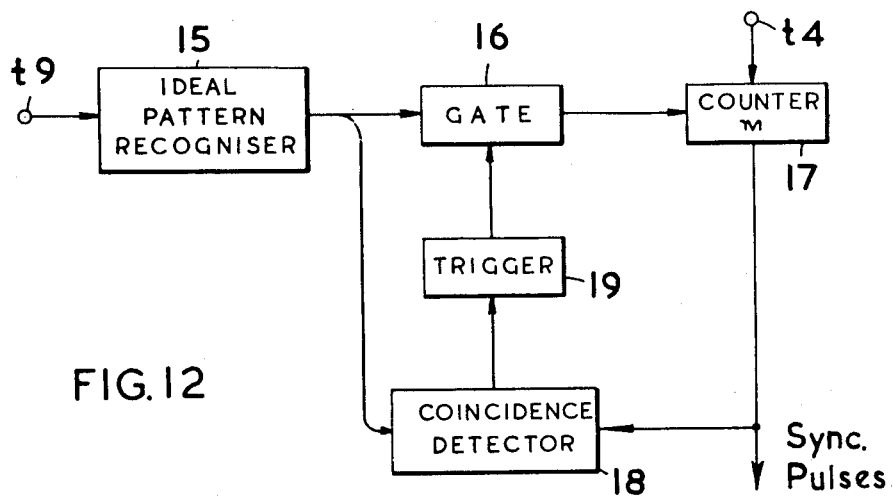

Figure 12 illustrates one arrangement in which this method is used. It will be assumed that a simple ideal pattern is inserted into the transmitted message at regular intervals of $m$ digit periods. At a receiver an ideal pattern recogniser 15, such as shown in Figure 5, generates a pulse whenever this pattern is received from the input terminal $t9$, either because it was deliberately inserted or occurred by chance. If no other pulse has been received for some time previously, gate 16 is open and the output pulse from the recogniser 16 is allowed to pass through and be applied to the resetting input of a counter 17, which is thereupon reset. This counter 17 is supplied with signals at the digit frequency from terminal $t4$ and the counter 17 counts these signals in groups of $m$, so that in the absence of a pulse from gate 16 it is reset every $m$th digit period. The action of resetting produces an output pulse which is sent to a coincidence detector 18. Because the resetting of the counter 17 was initiated by a pulse from the pattern recogniser 15, the detector 18 will perceive coincidence and set a flip-flop type trigger 19, an output from which is used to close the gate 16 and so cut off further counter resetting pulses. This condition is maintained until the trigger 19 resets itself after an elapse of time since a setting pulse is received which is arranged to be somewhat longer than $m$ digit periods.

The counter 17 resets automatically after $m$ pulses. If synchronism is correct the output pulse so generated will coincide with a pulse from the pattern recogniser so that the trigger 19 is set afresh and any interference with the counter 17 is held up for another M digit periods. In other words, as long as the system stays synchronised, no false pulses from the pattern recogniser 15 can get through to upset it. If the system is not synchronised, each pulse from the recogniser 15 is assumed to be a synchronising pulse until subsequent lack of coincidence with the counter output pulse produces no output from the detector 18 and the trigger 19 is allowed to reset. Gate 16 is therefore opened and will pass the true synchronising pattern sooner or later. True synchronisation is delayed only if by chance the preceding digit signals contain the synchronising pattern. Once synchronisation is established, further chance occurrences of the pattern will not disturb it as the gate 16 remains closed. The output from the counter 17 is used to derive the train of synchronising pulses.

I claim:

1. A method of defining a synchronising instant in a train of pulse code signals which comprises the step of replacing a series of $n$ pulse code signals by a synchronising pattern consisting of a series of $n$ digit signals of one of two types which when they are represented as $+1$ type or $-1$ type signals has an autocorrelation sequence of $(2n-1)$ terms of which the middle term is equal to $n$, and each end term is not greater than $+1$, while none of the other terms are as great as $n$ minus the number of terms it is removed from the middle term.

2. A pulse code transmitting apparatus comprising a generator of pulse code signals, an output circuit for transmitting said signals, a switch circuit in the output circuit, a generator of synchronising patterns of digit signals which comprises a series of $n$ digit signals of one of two types which when they are represented as $+1$ type or $-1$ type signals has an autocorrelation sequence of $(2n-1)$ terms of which the middle term is equal to $n$, and each end term is not greater than $+1$, while none of the other terms are as great as $n$ minus the number of terms it is removed from the middle term, means for feeding generated synchronising patterns to said switch circuit, a trigger circuit for controlling the switch circuit so that when the trigger circuit is in a first state pulse signals can pass through the switch circuit and be transmitted and when the trigger circuit is in a second state synchronising patterns of digit signals can pass, means for applying a synchronising pulse to the synchronising pattern generator to thereby commence the generation of a synchronising pattern of digit signals and to the trigger circuit to set it in the second state, and means for resetting the trigger circuit to its first state when a synchronising pattern has been generated.

3. A pulse code transmitting apparatus comprising a generator of pulse code signals, an output circuit for transmitting said signals, a switch circuit in the output circuit, a generator of a synchronising pattern of digit signals consisting of a sequence of digit signals having an autocorrelation sequence in which no term other than the middle term exceeds $+1$, means for feeding generated synchronising patterns to said switch circuit, a trigger circuit for controlling the switch circuit so that when the trigger circuit is in a first state pulse code signals can pass through the switch circuit and be transmitted and when the trigger circuit is in a second state synchronising patterns of digit signals can pass, means for applying a synchronising pulse to the synchronising pattern generator to thereby commence the generation of a synchronising pattern of digit signals, and to the trigger circuit to set it in the second state, and means for resetting the trigger circuit to its first state when a synchronising pattern has been generated.

4. A pulse code transmitting apparatus comprising a generator of pulse code signals, an output circuit for transmitting said signals, a switch circuit in the output circuit, a generator of a synchronising pattern of digit signals which consists of a sequence of digit signals $+1$, $+1$, $-1$, $+1$, $-1$, in any one of its four possible forms, means for feeding generated synchronising patterns to said switch circuit, a trigger circuit for controlling the switch circuit so that when the trigger circuit is in a first state pulse code signals can pass through the switch circuit and be transmitted and when the trigger circuit is in a second state synchronising patterns of digit signals can pass, means for applying a synchronising pulse to the synchronising pattern generator to thereby commence the generation of a synchronising pattern of digit signals, and to the trigger circuit to set it in the second state, and means for resetting the trigger circuit to its first state when a synchronising pattern has been generated.

5. A pulse code transmitting apparatus comprising a generator of pulse code signals, an output circuit for transmitting said signals, a switch circuit in the output circuit, a generator of a synchronising pattern of $n$ digit signals of one of two types which when they are represented as $+1$ type or $-1$ type signals has an autocorrelation sequence of $(2n-1)$ terms of which no term except the middle term is positive, and where the number $n$ of digit signals in the pattern is one less than a multiple of four, and where by counting the digit signals of the pattern at the same time from the two ends, of the pairs of digit signals so obtained, the odd numbered pairs are made up of unlike digit signals and the even numbered pairs are made up of like digit signals, means for feeding generated synchronising patterns to said switch circuit, a trigger circuit for controlling the switch circuit so that when the trigger circuit is in a first state pulse code signals can pass through the switch circuit and be transmitted and when the trigger circuit is in a second state synchronising patterns of digit signals can pass, means for applying a synchronising pulse to the synchronising pattern generator to thereby commence the generation of a synchronising pattern of digit signals, and to the trigger circuit to set it in the second state, and means for resetting the trigger circuit to its first state when a synchronising pattern has been generated.

References Cited in the file of this patent

UNITED STATES PATENTS

| | | |
|---|---|---|
| 1,637,080 | Kesses | July 26, 1927 |
| 2,635,229 | Gloess et al. | Apr. 14, 1953 |
| 2,648,829 | Ayres et al. | Aug. 11, 1953 |